US006917810B2

(12) United States Patent
Julka et al.

(10) Patent No.: US 6,917,810 B2
(45) Date of Patent: Jul. 12, 2005

(54) OPTIMIZATION OR CIRCUIT CALL SETUP AND DELIVERY ASSOCIATED WITH INTER-MSC PACKET DATA HANDOFF

(75) Inventors: Vibhor Julka, San Diego, CA (US); Roger Gustavsson, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 763 days.

(21) Appl. No.: 10/007,586

(22) Filed: Dec. 5, 2001

(65) Prior Publication Data

US 2003/0104813 A1 Jun. 5, 2003

(51) Int. Cl.[7] ............................................... H04Q 7/20
(52) U.S. Cl. ................. 455/439; 455/432.1; 455/435.1; 455/436
(58) Field of Search ................................ 455/436–444, 455/432.1–434, 445, 435.1–435.3, 560, 422.1, 403, 426.1, 448, 454; 370/331

(56) References Cited

U.S. PATENT DOCUMENTS

| 5,857,153 A | 1/1999 | Lupien ........................ 455/436 |
| 6,038,449 A | 3/2000 | Corriveau et al. ........... 455/439 |
| 6,169,900 B1 * | 1/2001 | Lahtinen ...................... 455/439 |
| 6,285,880 B1 | 9/2001 | Gagnon et al. ........... 455/432.1 |
| 6,353,607 B1 * | 3/2002 | Valentine et al. ........... 370/349 |
| 6,721,565 B1 * | 4/2004 | Ejzak et al. ................. 455/436 |
| 2003/0054822 A1 * | 3/2003 | Core et al. ................... 455/436 |

FOREIGN PATENT DOCUMENTS

WO WO 01/31939 5/2001

OTHER PUBLICATIONS

3rd Generation Partnership Project 2 "3GPP2"; Circuit Voice Call Delivery After Handoff for Concurrent Services; Nov. 5, 2001; 10 pgs.

* cited by examiner

Primary Examiner—Sonny Trinh
Assistant Examiner—Eliseo Ramos-Feliciano
(74) Attorney, Agent, or Firm—Coats & Bennett, P.L.L.C.

(57) ABSTRACT

A serving MSC in a wireless communication network, such as an IS-2000 network, uses standard signaling messages in an unconventional manner to allow it to take on the role of an anchor MSC under certain inter-MSC handoff conditions. When a mobile station engaged in an active packet data call is handed off from an anchor MSC to the serving MSC, the serving MSC sends an indication to the anchor MSC that the data call has been released even though the call is still active. The serving MSC then causes the HLR location information for the mobile station to be updated to identify the serving MSC as the new anchor MSC. Thus, the serving MSC becomes the anchor MSC under conditions where it otherwise would not, which avoids routing subsequent voice calls through the previous anchor MSC. The above approach also includes variations that accommodate concurrent voice and data handoff scenarios.

23 Claims, 10 Drawing Sheets

OPTIMIZATION OR CIRCUIT CALL SETUP AND DELIVERY ASSOCIATED WITH INTER-MSC PACKET DATA HANDOFF

BACKGROUND OF THE INVENTION

The present invention generally applies to wireless communication networks, and particularly applies to improving call routing efficiencies where an inter-MSC handoff is involved.

Wireless communication networks based on TIA/EIA/IS-2000 standards (cdma2000 networks) interface with public data networks (PDNs), such as the Internet, as well as with traditional circuit-switched networks, such as the Public Switched Telephone Network (PSTN). These networks typically include complementary sets of network entities, some shared, to support both data (packet-switched) and voice (circuit-switched) calls. For example, mobile switching centers (MSCs) within the wireless communication network provide call management (setup/teardown, etc.) services, as well as providing a communications link from the wireless network to the PSTN. Thus, MSCs play a central role in managing voice traffic between the wireless network and the PSTN.

In data calls, while the MSC is still involved in certain aspects of call setup/teardown, it does not carry the packet data traffic. Rather a packet control function (PCF) communicatively links the radio network to a packet data serving node (PDSN), which is coupled to the PDN. These routing differences between voice and data calls affect the manner in which wireless communication networks, and the various entities within those networks, manage call routing. In some instances, the routing differences lead to certain inefficiencies.

For example, routing inefficiencies can arise as a wireless network user moves from one location to another. The wireless communication network(s) must track movement of the user as the user moves through different coverage areas. The user may move between coverage areas comprising a single wireless communication network, or may cross the coverage area of multiple wireless communication networks. In either case, standard signaling protocols exist for passing cellular subscriber information from one carrier to another. One such protocol is TIA/EIA/ANSI-41, commonly referred to as IS-41. IS-41 is a standard for inter-switch signaling and permits users to roam across the wireless networks of many different carriers (network operators) by allowing the various network entities to track the location of the user via standardized protocol messages. Commonly, IS-41 messages are carried via System Signaling 7 (SS7) networks IS-41 standards provide standardized methods for mobile station registration, authentication, and handoff. For example, IS-41 allows a remote network to inform a home network that a user has registered for service through the remote network. If a call is placed to the user, a home location register (HLR) in the home network provides this information to assist in call routing. How that call is routed and what network elements are involved depends on the type of call, and it is in that distinction that at least one area of potential call routing inefficiency arises.

For example, with circuit-switched calls (e.g., mobile terminated or originated voice calls), a particular MSC provides the circuit-switched link to the PSTN. That MSC is referred to as the "anchor" MSC. As the mobile moves from the coverage area of the anchor MSC, it is handed off to another MSC, which is referred to as the "serving" MSC. Because the PSTN connection remains with the anchor MSC, voice traffic for the call is routed through the anchor MSC and the serving MSC. A bearer service for this traffic is established on inter-MSC trunk lines. Once the call ends, the mobile may originate another call or re-register with the network, thereby establishing a new anchor MSC.

For data packet calls, the MSCs are not required to establish bearer services for the packet data traffic because that type of call traffic is routed through other network entities such as packet control functions (PCFs) and packet data serving nodes (PDSNs). Nonetheless, inter-MSC handoffs follow signaling conventions similar to those used for circuit-switched call handoffs, and the notion of anchor and serving MSC still applies, even though the MSCs are not needed for bearer service in this context. Note that IS-41 has extensions defined by PN-4720 (PN4720 TIA/EIA-41-D Network Based Enhancements for CDMA Packet Data Service) for packet data call-related signaling.

Once consequence of the above approach to packet data call handoff is that circuit-switched call routing inefficiency may be unnecessarily incurred for mobile stations that have undergone an inter-MSC handoff while engaged in an active packet data call. For example, a mobile station engaged only in a packet data call moves from the coverage area of its anchor MSC to a new MSC, which becomes the serving MSC. Any circuit switched call incoming to the mobile is routed through the anchor MSC to the serving MSC, when, ideally, it should have been routed directly to the serving MSC.

This undesirable routing of voice call traffic is inheren/ unavoidable with the existing standards, because the anchor MSC does not change until a subsequent call origination or registration event performed by the MS after termination of the current call. Thus, CDMA wireless communication networks need a more efficient approach to IS-41/PN-4720 based call routing. Preferably, this solution would be standards-compliant and unobtrusive to users.

BRIEF SUMMARY OF THE INVENTION

The present invention provides a signaling method and a communication system that avoids voice call routing inefficiencies associated with inter-MSC data call handoffs in wireless communication networks that provide both voice and packet data services, and that employ IS-41 inter-network signaling. Wireless communication networks based on the TIA/EIA/IS-2000/2001 standards exemplify this type of communication network. In an exemplary embodiment, when a serving MSC receives a mobile station engaged in an active data call in handoff from an anchor MSC, the serving MSC uses standard IS-41 signaling to cause the anchor MSC to release data call connection resources. The serving MSC also assumes the role of anchor MSC by using IS-41 signaling to update HLR information for the MS. This latter action prevents a subsequent voice call from being routed through the original anchor MSC.

The signaling method of the present invention operates transparently to a user of the MS, and does not require modifying existing IS-41 standards. Indeed, the exemplary approach only requires modifying operation of the MSCs, such that the MSCs generate the desired IS-41 signaling messages when playing the role of serving MSC in inter-MSC handoffs. That is, exemplary embodiments of the present invention advantageously uses standard signaling messages in an unconventional manner to allow a serving MSC to take on the role of anchor MSC under certain inter-MSC handoff conditions.

Other features and advantages of the present invention will be apparent to those skilled in the art upon reading the following detailed description, and in view of the associated drawings. Of course, the following details are exemplary, and those skilled in the art will recognize the substantial variations that may be practiced.

DETAILED DESCRIPTION OF THE INVENTION

Figure 1:
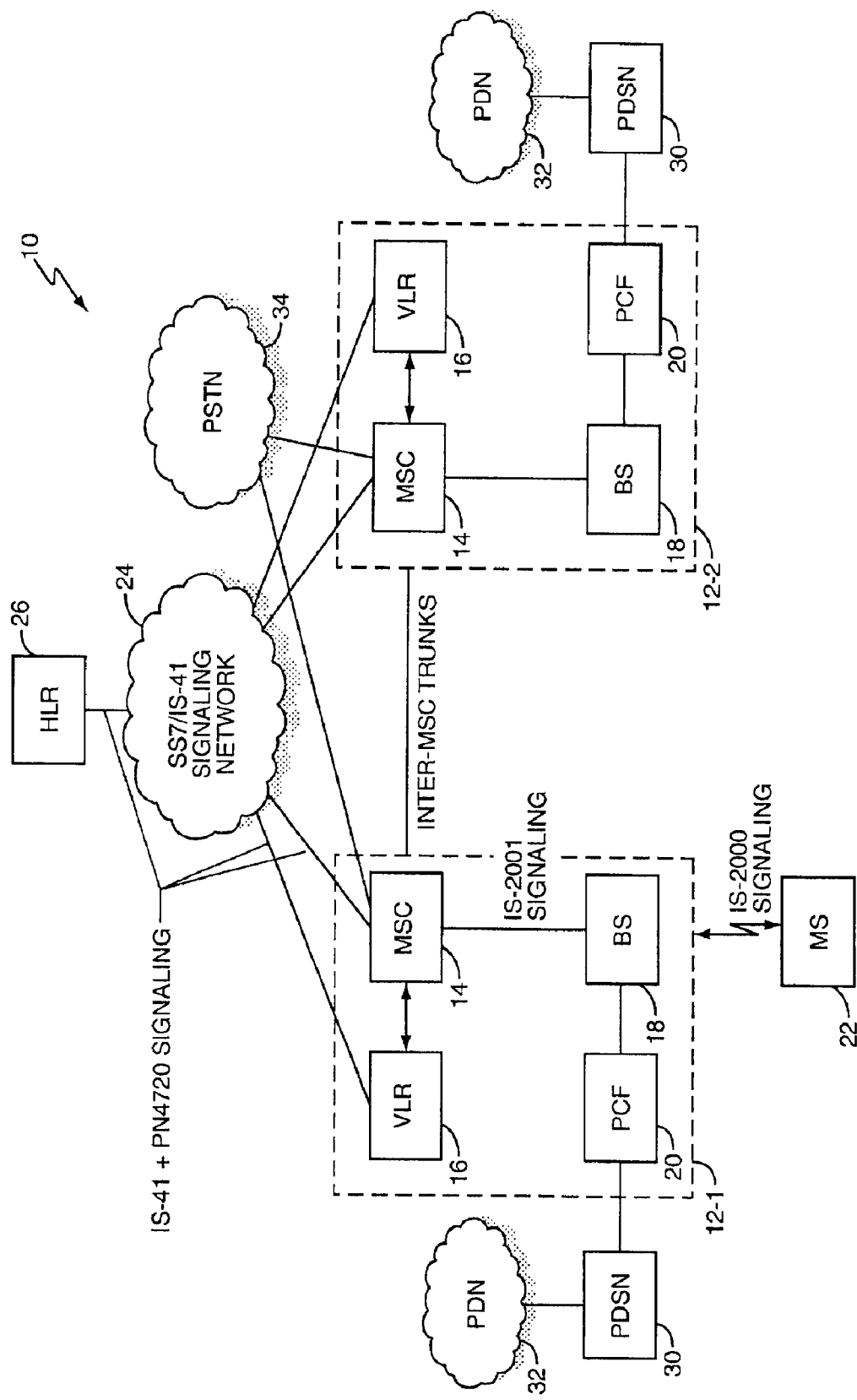
FIG. 1 is a schematic diagram of the communication network.

FIG. 1 is a diagram illustrating an overall wireless communication network generally referred to by the numeral 10. Multiple radio networks are generally referred to by the numeral 12, with individual ones referred to as 12-1, 12-2, and so on. These individual radio networks 12 each comprise a mobile switching center (MSC) 14, a visitor location register (VLR) 16, a base station (BS) 18, and a packet control function (PCF) 20. It should be understood that this simplified diagram does not depict network entities that are not directly germane to discussion of the present invention, and that actual network implementations may include pluralities of the illustrated entities. For example, typical radio networks 12 include multiple BSs 18 geographically organized into wireless service coverage cells. Here, BSs 18 implicitly include both base station controller (BSC) resources, as well as the physical radio resources, typically denoted as radio base stations (RBSs). In any case, the BSs 18 provide wireless communication links with MSs 20.

In this capacity, the BSs 18 may route communication traffic to and from pluralities of MSs 22 either through MSCs 14, or through PCFs 20. The type of traffic associated with a given call determines which entities are involved in carrying call traffic. Generally, circuit-switched voice calls are routed through MSCs 14, which are communicatively coupled to the PSTN 34 or other circuit-switched network. A signaling network, such as an SS7/IS-41 network, provides access to a home location register (HLR) 26, which contains MS-associated information used in inter-network switching and enables signaling between the various network entities involved in the handoff.

Packet data calls are generally routed through PCFs 20, which are coupled to one or more PDNs 32 via packet data serving nodes (PDSNs) 30 acting as gateway routers. With data calls, the bearer service carrying packet data traffic associated with the call does not pass between MSCs 14 in handoff. Rather, the packet data traffic is simply rerouted by the involved PDSNs 30 from a first PCF 20 to a second PCF 20. However, with voice calls (circuit-switched calls) the bearer service carrying traffic associated with the call is routed between MSCs 14 via inter-MSC trunks following handoffs.

Figure 2:
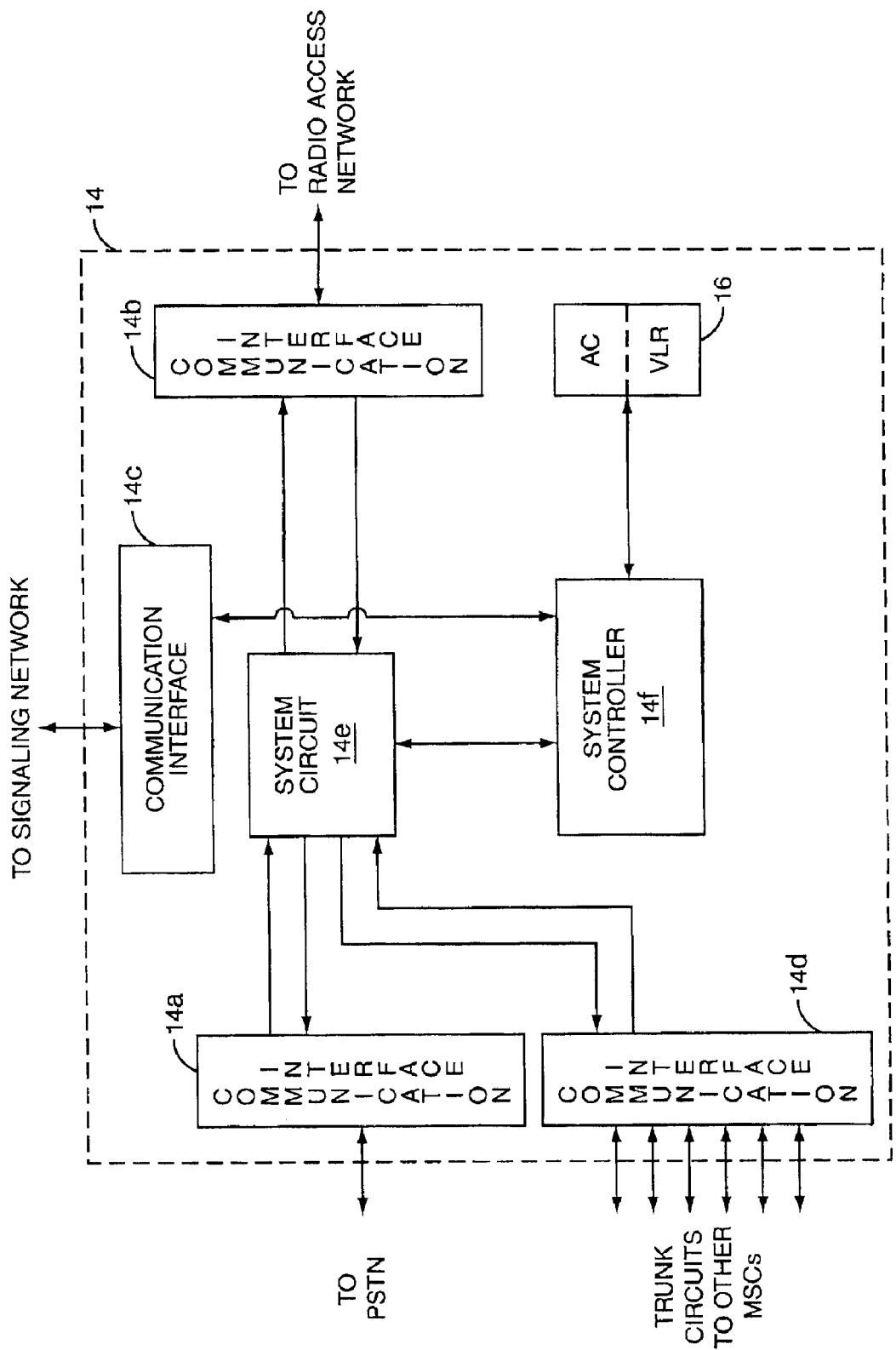
FIG. 2 is a functional block diagram of an exemplary MSC in the network of FIG. 1.

FIG. 2 illustrates the components of an exemplary MSC 14 in more detail, but it should be understood that other MSC architectures and implementations are possible, and that the present invention is not limited to the illustrated MSC.

The MSC 14 comprises a plurality of communication interfaces 14A–14D, a switching circuit 14E, and a system controller 14F. The communication interfaces 14A–14D connect the MSC to other network entities. Communication interface 14A connects the MSC to the PSTN. Communication interface 14B connects the MSC 14 to the base stations in the coverage area of the MSC 14. Communication interface 14C connects the MSC 14 to a signaling network used for signaling between various network entities. Communication interface 14D provides trunk connections between the MSC 14 and other MSC's within the network 10. Switching circuit 14E routes mobile station call data to and from base stations within the coverage area of the MSC. The switching circuit routes call data originating with the mobile station to the PSTN. If the MSC 14 is an anchor MSC, the call data originating from the mobile station 22 may be routed to a serving MSC via one of its trunk connections following an inter-MSC handoff. Call data intended for the mobile station is received at communication interface 14A and routed by switching circuit 14E to the appropriate base station via communication interface 14B. If the MSC 14 is routing data to a serving MSC, data flows from communication interfaces 14a to 14e and then to 14d. At a serving MSC, call data for a mobile station may be received on communication interface 14D.

The system controller 14f coordinates the operations of the MSC. One of the functions performed by the MSC is call processing. Call processing includes setting up connections for calls to or from mobile stations within its coverage area, which necessarily requires signaling between the MSC 14 and other network entities. Communication interface 14C provides a connection to a signaling network, such as an SS7 network, for carrying signaling messages between the network entities. The MSC 14 may include other elements, such as the previously mentioned VLR 16. Additionally, the MSC 14 may include an authentication center 14G that authenticates mobile stations registering with the network.

A better understanding of the different routing scenarios and particularly of the inefficient routing scenarios addressed by the present invention may be gained through a discussion of several exemplary call flows. It should be understood that where IS-41 signaling procedures are referred to herein in the context of specific signaling examples for packet data calls, the use of PN-4720 is implied.

Figure 3:
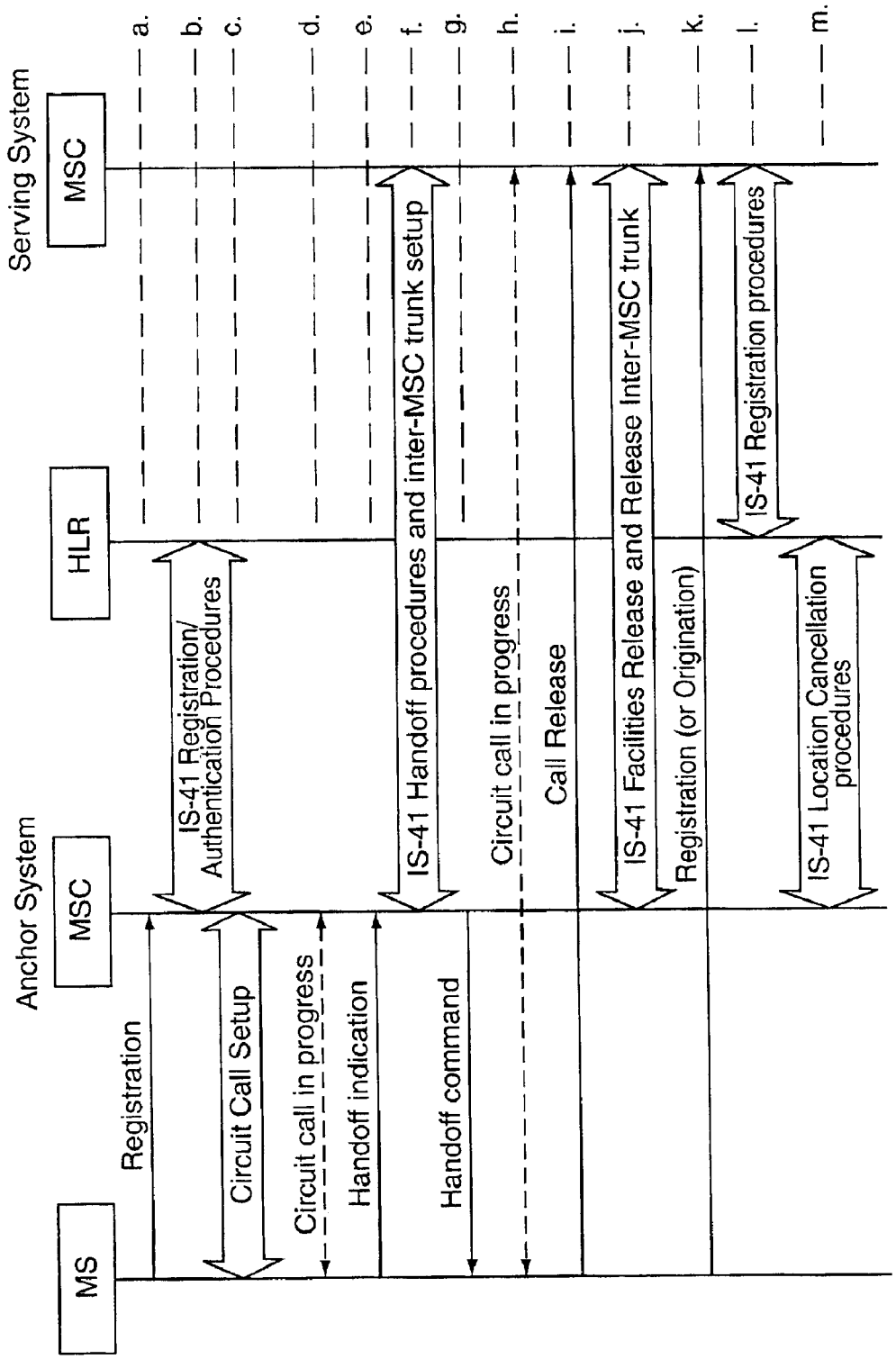
FIG. 3 is a call flow diagram illustrating a conventional signaling procedure for an inter-MSC handoff involving a mobile station engaged in a voice call.

This discussion begins with the illustration of FIG. 3, which depicts inter-MSC handoff for a MS 22 engaged in an active voice call, and includes these details:

(a) The MS 22 performs an initial registration through one of the radio networks 12, referred to as the "anchor system." Registration entails the MS 22 sending an air interface registration message to the BS 18 of the anchor system. The BS 18 relays this message per IS-2001-A procedures to the MSC 14 (henceforth referred to as the anchor MSC).

(b) The anchor MSC forwards the registration and received authentication information to its associated VLR 16, referred to as the anchor VLR. The anchor VLR will have no record of the subscriber (MS 22) and performs normal IS-41 authentication/registration procedures with the HLR 26 via the signaling network 24. After authentication and verification, the HLR 26 sends subscriber profile information to the anchor VLR. The anchor VLR then notifies the anchor MSC of the registration results. At this point, a record of the subscriber is maintained at the anchor VLR. Additionally the HLR 26 updates its location information for the MS 22 in question to indicate the anchor MSC as the current location of the MS 22.

(c) The MS 22 sets up a circuit switched call (e.g., a mobile terminated or originated voice call) with the anchor MSC.

(d) The MS 22 continues with the voice call for some period.

(e) At some point, the MS 22 indicates the need for a handoff to a new BS 18 not under supervision of the anchor MSC.

(f) The anchor MSC initiates IS-41 handoff procedures to handoff of the MS 22 to the supervising MSC for the BS 18 receiving the MS 22 in handoff, which is referred to as the "serving" MSC. Since the service instance in question is a voice call, an inter-MSC trunk will also be setup between the anchor and serving MSCs via the signaling network 24. The serving MSC sets up the necessary resources at the serving BS 18 using IS-2001A handoff procedures and indicates this action to the anchor MSC.

(g) The anchor MSC indicates to the MS 22 that it should proceed with the handoff.

(h) The voice call remains active during and after the handoff process.

(i) At some point following the handoff, the voice call is released.

(j) Upon receipt of a release indication, the serving MSC releases all base station resources associated with the call, and initiates IS-41 release procedures with the anchor MSC, including release of the associated inter-MSC trunk.

(k) Some later time, the MS 22 initiates registration or performs a call origination through the serving system (i.e., using the serving MSC/VLR).

(l) Upon the next registration or mobile origination event, the serving MSC/VLR, having no record or entry associated with the MS 22, initiates IS-41 registration procedures with the HLR 26. The HLR 26, in turn, updates its location information for the MS 22 to indicate the serving MSC as the MS's current location, and sends the subscriber record to the serving VLR. Thus, the serving system becomes the new anchor system as regards subsequent call processing for the MS 22.

(m) After the registration from the serving MSC is complete, the HLR initiates IS-41 Location Cancellation procedures with the anchor MSC. Successful completion of this procedure causes the subscriber profile for the MS 22 to be deleted from the anchor VLR.

Figure 4:
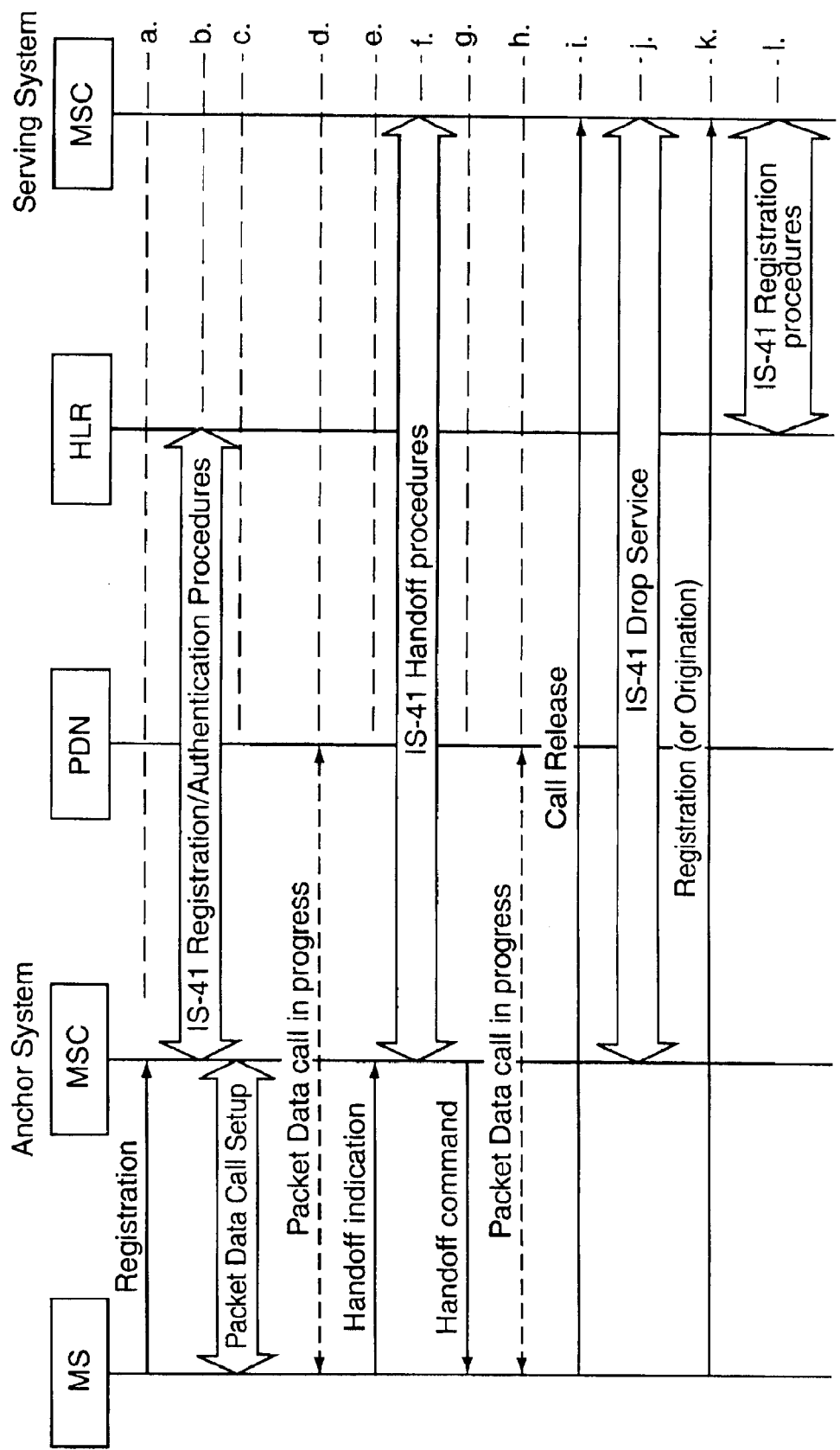
FIG. 4 is a call flow diagram illustrating a conventional signaling procedure for an inter-MSC handoff involving a mobile station engaged in a data call.

FIG. 4 illustrates inter-MSC handoff for a MS 22 engaged in an active data call, and includes the following details:

(a) The MS 22 performs an initial registration through one of the radio networks 12, referred to as the "anchor system." Registration entails the MS 22 sending an air interface registration message to the BS 18 of the anchor system. The BS 18 relays this message per IS-2001-A procedures to the MSC 14 (henceforth referred to as the anchor MSC).

(b) The anchor MSC forwards the registration and received authentication information to its associated VLR 16, referred to as the anchor VLR. The anchor VLR will have no record of the subscriber (MS 22) and performs normal IS-41 authentication/registration procedures with the HLR 26 via the signaling network 24. After authentication and verification, the HLR 26 sends subscriber profile information to the anchor VLR. The anchor VLR then notifies the anchor MSC of the registration results. Additionally the HLR 26 updates its location information for the MS 22 in question to indicate the anchor system (anchor VLR) as the current location of the MS 22. At this point, a record of the subscriber is maintained at the anchor VLR, which may be co-located with or form a part of the anchor MSC.

(c) The MS 22 sets up a packet data call. Packet data traffic is not routed through the MSC. Rather it is routed through BS 18, PCF 10, and PDSN 30 to PDN 32. For simplicity, only the PDN is indicated.

(d) The packet data call remains active for some period.

(e) At some point during the data call, the MS 22 indicates the need for a handoff to a BS 18 not under the control of the anchor MSC.

(f) The anchor MSC initiates IS-41 handoff procedures to handoff the MS 22 to another MSC 14, referred to as the serving MSC. Since the service instance in question is a data call, an inter-MSC trunk is not needed. The serving MSC sets up the necessary resources at the serving BS 18 using IS-2001A handoff procedures and indicates this action to the anchor MSC.

(g) The anchor MSC indicates to the MS 22 that it should proceed with the handoff.

(h) The data call remains active during and after the inter-MSC handoff.

(i) At some later timer, the packet data call is released.

(j) Upon receipt of a release indication, the serving MSC releases all base station resources associated with the call, and initiates IS-41 drop service procedures with the anchor MSC.

(k) Some later time, the MS 22 initiates registration or performs a call origination through the serving system (i.e., using the serving MSC/VLR).

(l) Upon the next registration or mobile origination, the serving MSC/VLR, having no record or entry associated with the MS 22, initiates IS-41 registration procedures with the HLR 26. The HLR 26, in turn, updates its location information for the MS 22 to indicate the serving MSC as the MS's current location, and sends the subscriber record to the serving VLR. Thus, the serving system becomes the new anchor system as regards subsequent call processing for the MS 22.

In the above inter-MSC handoff scenarios, standard IS-41 signaling procedures were used to maintain the call during handoff of the MS 22 from the anchor system to the serving system. In both the voice and data call scenarios, the serving MSC/VLR eventually took on the role of anchor MSC/VLR, responsive to the MS 22 registering or originating a call through the serving MSC after release of the earlier call.

However, there exists an opportunity for call routing inefficiency within networks 10 when a MS 22 engaged in a data call has undergone an inter-MSC handoff. Until the MS 22 re-registers in the serving system, which occurs after the data call is released and the MS 22 initiates a registration or an origination through the serving MSC, the anchor MSC maintains subscriber profile information for the MS 22, and location information for the MS 22 at the HLR 26 still points to the anchor MSC. Thus, a voice call for the MS 22 incoming to an originating system (e.g., one of the radio networks 12) is routed through the anchor MSC to the serving MSC via inter-MSC trunks. This indirect routing results from the originating system being directed to the anchor system by the HLR's location information for the MS 22.

Thus, where a MS 22 has undergone inter-MSC handoff during a data call, the opportunity for subsequent indirect voice call routing arises. More specifically, indirect routing can arise if the network 10 and MS 22 both support concurrent voice and data services, such that the MS 22 can receive an incoming voice call while engaged in the data call. Indirect routing also may occur even where concurrent services are not supported, if the MS's data call goes dormant after inter-MSC handoff, and the MS 22 does not re-register or re-originate through the serving system prior to a voice call for the MS 22 incoming to an originating system.

Figure 5:
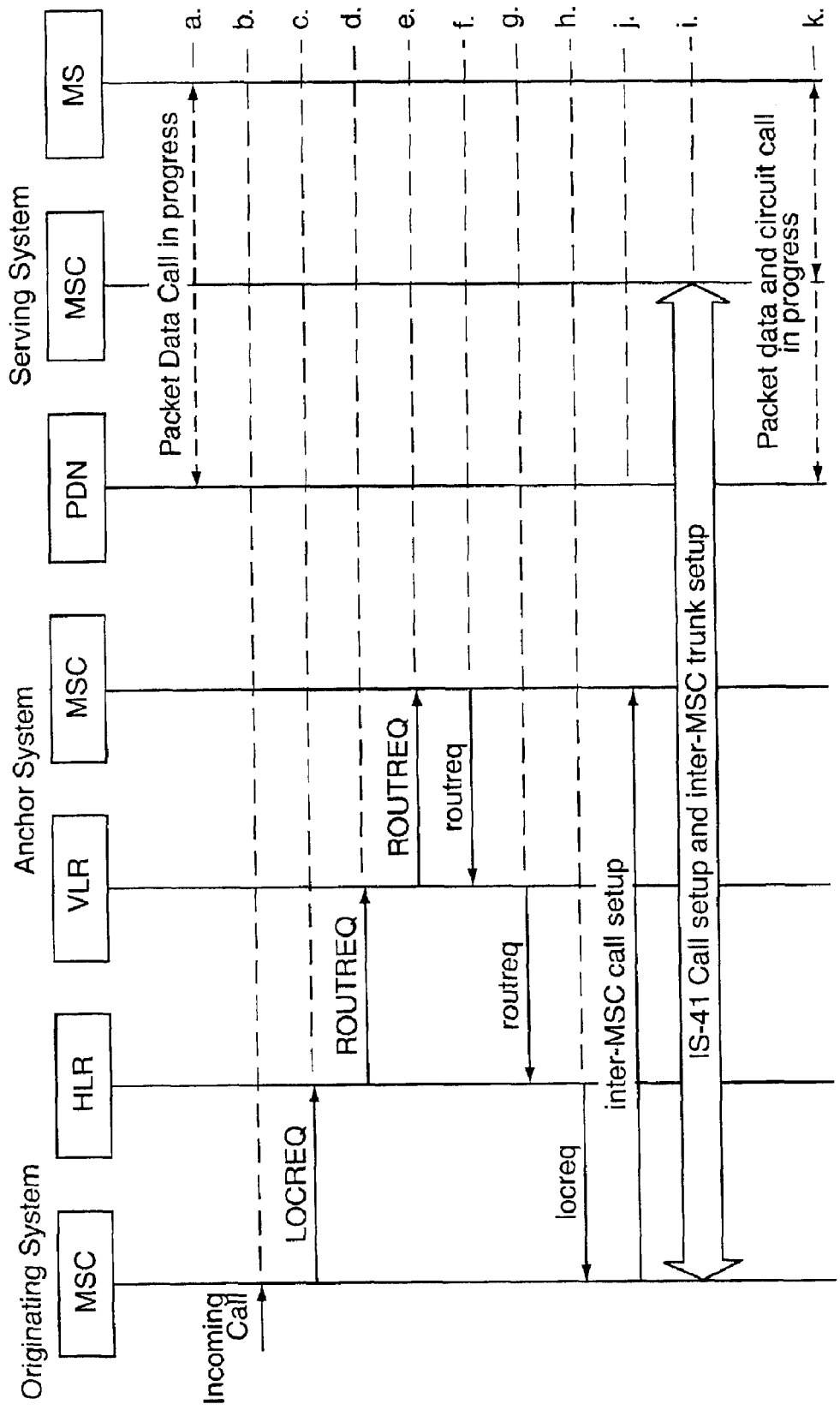
FIG. 5 is a call flow diagram illustrating a conventional signaling procedure for indirect routing of an incoming voice call to a mobile station engaged in a packet data call with a serving MSC.

FIG. 5 illustrates the inefficient call routing that may arise when a mobile station is capable of concurrent voice and data calls:

(a) The MS 22 is engaged in an active packet data call. The anchor MSC has handed off to the serving MSC, but the MS 22 is still registered at the anchor MSC.

(b) An incoming voice call for the MS 22 arrives at an originating MSC.

(c) The originating MSC sends an IS-41 LOCREQ message to the HLR 26 to request routing information for the MS 22.

(d) The HLR 26 sends a ROUTREQ to the anchor VLR where the MS 22 is registered, requesting routing information.

(e) The anchor VLR forwards the request to the anchor MSC.

(f) The anchor MSC assigns a Temporary Directory Location Number (TDLN) for the MS 22 and returns the routing information to the anchor VLR in a routreq response message.

(g) The anchor VLR forwards the routreq response message to the HLR 26.

(h) The HLR 26 sends the routing information to the originating MSC in a locreq response message.

(i) The originating MSC sets up the call to the anchor MSC.

(j) The anchor MSC sets up the call with the serving MSC, and the serving MSC allocates the necessary resources at the serving BS 18. Since the service that is being added is a circuit switched call, an inter-MSC trunk between the anchor and serving MSC is also set up using IS-41 procedures.

(k) The serving MSC then supports concurrent data and voice calls with the MS 22, with the voice traffic routing suffering some inefficiency by going from the originating MSC through the anchor MSC rather than directly to the serving MSC.

Figure 6:
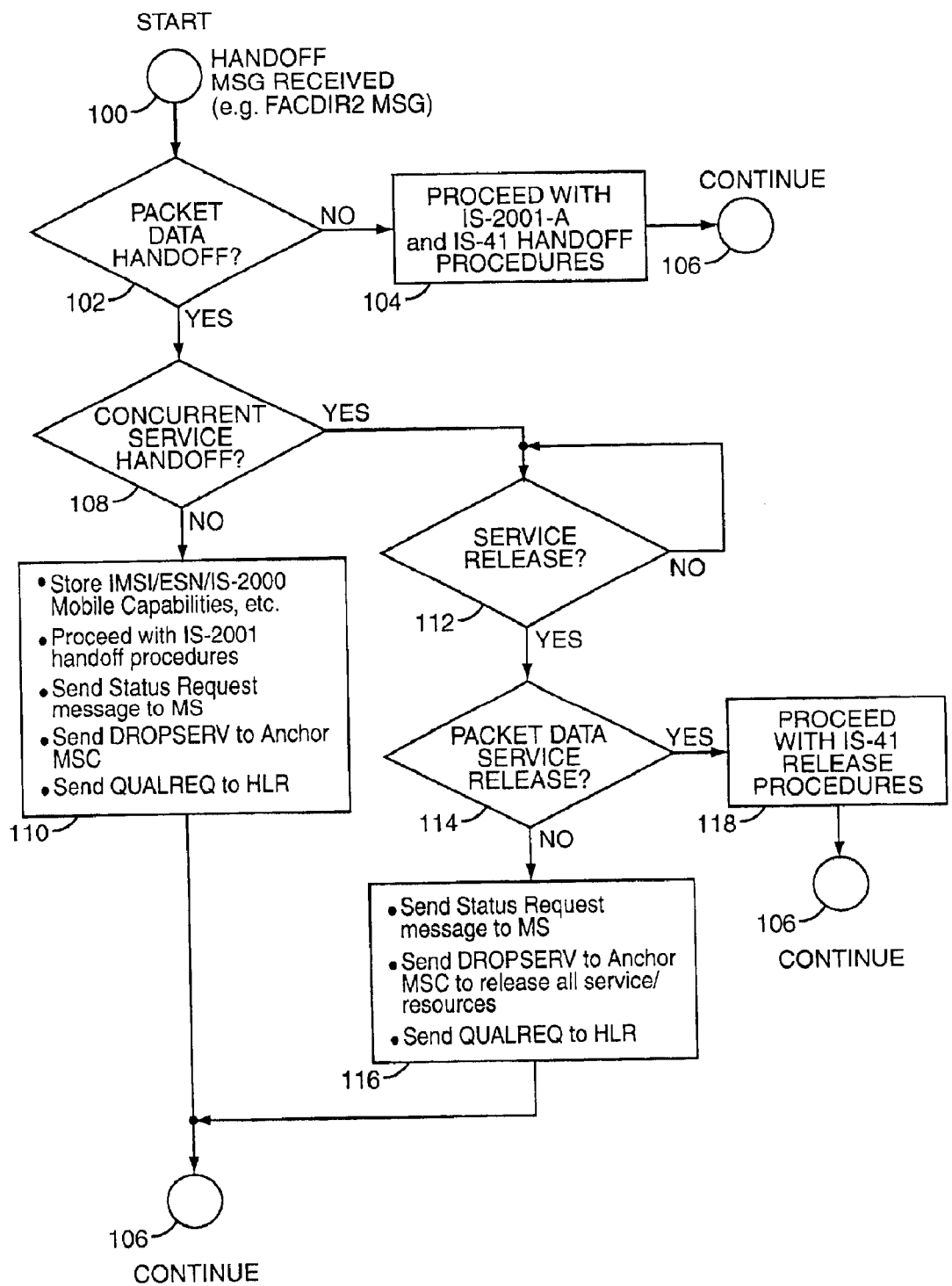
FIG. 6 is a flow diagram illustrating novel handoff procedures used by an MSC in the network of FIG. 1 in accordance with the present invention.

FIG. 6 illustrates an exemplary signaling procedure that addresses the undesirable voice call routing inherent with conventional network operation. Call processing logic as illustrated in FIG. 6 may comprise software or other program logic executing on one or more processors or processing systems available in the MSCs 14. The logic of FIG. 6 applies to a MSC 14 when it operates in the role of a serving MSC.

Processing starts (Step 100) with the serving MSC receiving a handoff message from an anchor MSC. Under IS-41 signaling, this message typically comprises a FacilitiesDirective message (e.g., a FACDIR2 message). The serving MSC uses information contained in the handoff message to determine what services (i.e., voice, data, or concurrent voice and data) are involved in the handoff (Step 102). For example, IS-2000 packet data service is indicated by Service Option 33 within the FACDIR2 message. Similarly, an IS-707 packet data service option in the CDMAConnectionReferenceList information element of the FACDIR2 message indicates packet data service for an IS-95 MS 22 (IS-95 being a well-known prior generation of CDMA wireless network standard). In any case, if the serving MSC determines that the MS 22 being handed off from the anchor MSC is not engaged in an active data call, the serving MSC executes existing IS-2001-A and IS-41 voice call handoff procedures (Step 104), and processing continues with other MSC operations as needed (Step 106).

If the handoff message does indicate that the MS 22 is engaged in an active data call, the serving MSC determines whether there exists a concurrent voice call service (Step 108). If not, the serving MSC undertakes a series of actions that exploit existing standardized signaling to prevent the inefficient routing of a subsequent voice call for the MS 22 through the anchor MSC (Step 110).

Specifically, in this exemplary flow, the serving MSC performs the following actions:

store the International Mobile Station Identifier (IMSI), the Electronic Serial Number (ESN), and the IS-2000 Mobile Capabilities associated with the MS 22—other information may be stored, such as supported bandclasses, slot mode operation, Mobile Protocol Revision Level, etc., and exactly what information is stored is to some extent a matter of vendor preference;

proceed with IS-2001-A and IS-41 handoff procedures (anchor-to-serving MSC);

send a Status Request message to the MS 22 to obtain MS-specific information such as "slot cycle index" and "user zone" information, if applicable;

send a release message (e.g., DROPSERV message) to the anchor MSC to cause the anchor MSC to release resources or otherwise clear selected information for the MS 22 at the anchor MSC (note that this DROPSERV message is sent despite the fact that the data call is still active, essentially "tricking" the anchor MSC to behave as it would under normal packet data call release circumstances); and send a QUALREQ (QualificationRequest Invoke) message to the HLR 26, causing the HLR 26 to update its location information for the MS 22 and allowing the serving MSC to assume the role of anchor MSC so that a voice call incoming to the MS 22 from an originating system will be routed directly to the new anchor MSC (the serving MSC) rather than through the former anchor MSC.

Note that the above information stored by the serving MSC for the MS 22 (i.e. IMSI/ESN, etc.) may be obtained in part from the handoff message, and in part from the MS 22, or may be obtained entirely from the MS 22. In any case, after the serving MSC causes the registration information for the MS 22 to be updated at the HLR 26, processing continues with other MSC operations as needed (Step 106).

If the MS 22 is engaged in concurrent voice and data calls, the serving MSC waits for the release of one or both of these services (Step 112). Two release scenarios are possible: the voice call is released prior to the data call, or the data call is released prior to the voice call. If the data call is released first, or both voice and data services are released simultaneously (Step 114), the serving MSC simply proceeds with standard IS-41 release procedures (Step 118), and processing continues with other MSC operations as needed (Step 106).

If the voice call is released first, there exists an opportunity for the serving MSC to avoid subsequent incoming voice call routing inefficiencies by causing the registered location information for the MS 22 to be updated in the HLR 26 to indicate the serving MSC as the MS's current location (Step 116). This action is essentially the same as the series of actions outlined for Step 110. In this situation, the serving MSC preferably performs the following actions:

- send a Status Request message to the MS 22 to obtain connection-related or mobile-specific information such as IMS, ESN, IS-2000 capabilities, user zone ID, "slot cycle index," etc.;
- send a DROPSERV message from the serving MSC to the anchor MSC to indicate the release of both voice and data services, thereby causing the anchor MSC to release all resources assigned for the inter-MSC handoff, including the inter-MSC trunk. The message is sent despite the fact that the data call is still active, essentially "tricking" the anchor MSC to behave as it would under concurrent services release; and
- send a QUALREG message to the HLR 26, causing the HLR 26 to update its location information for the MS 22 and allowing the serving MSC to assume the role of a new anchor MSC so that a voice call incoming to the MS 22 from an originating system will route directly to the new anchor MSC rather than through the former anchor MSC.

Upon completing the re-registration of the MS 22 with serving MSC, the serving MSC becomes the new anchor MSC, and processing continues with other MSC operations as needed.

Figure 7:
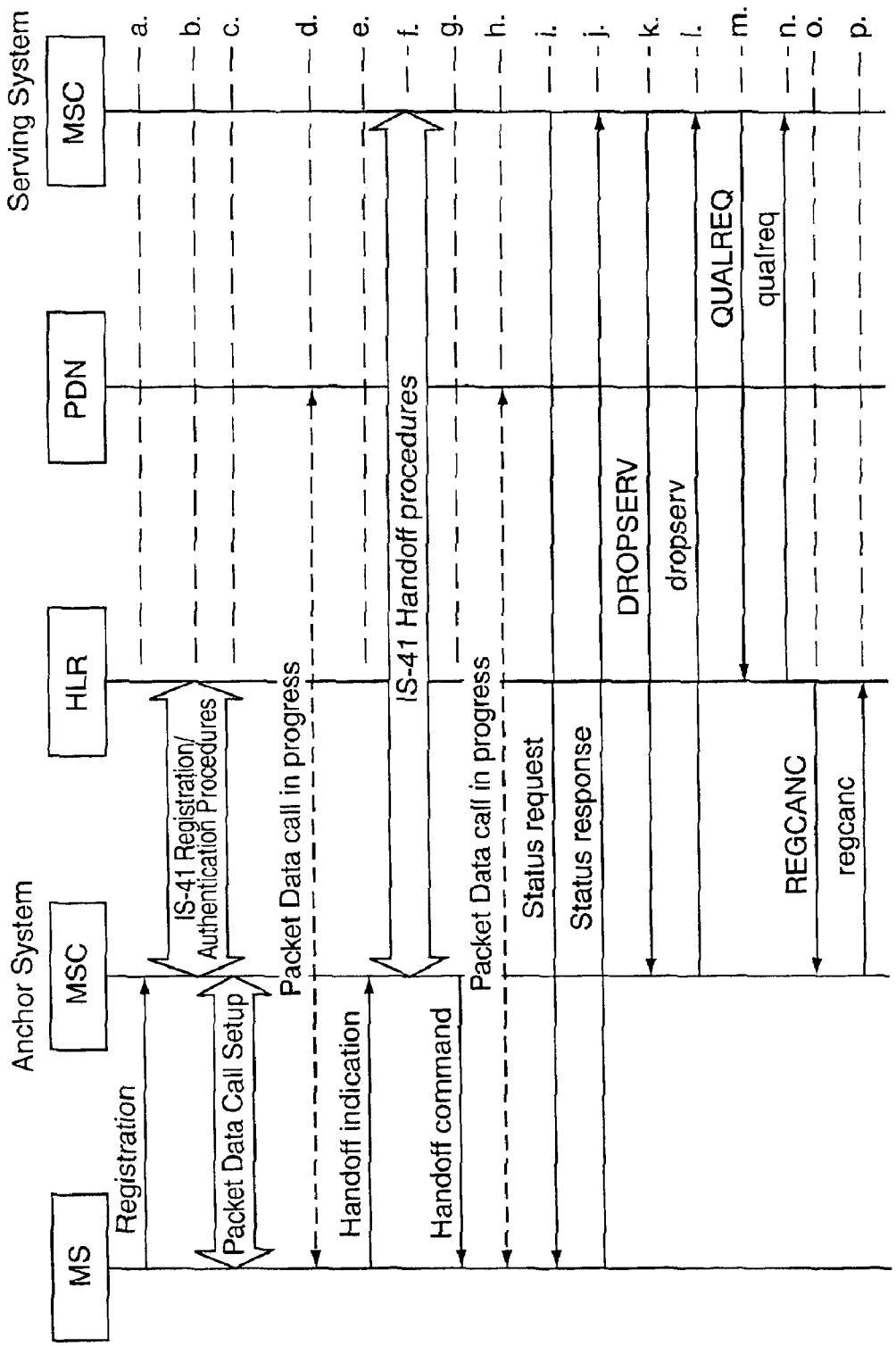
FIG. 7 is a call flow diagram illustrating a signaling procedure according to the present invention for an inter-MSC handoff involving a mobile station engaged in a data call.
Figure 8A:
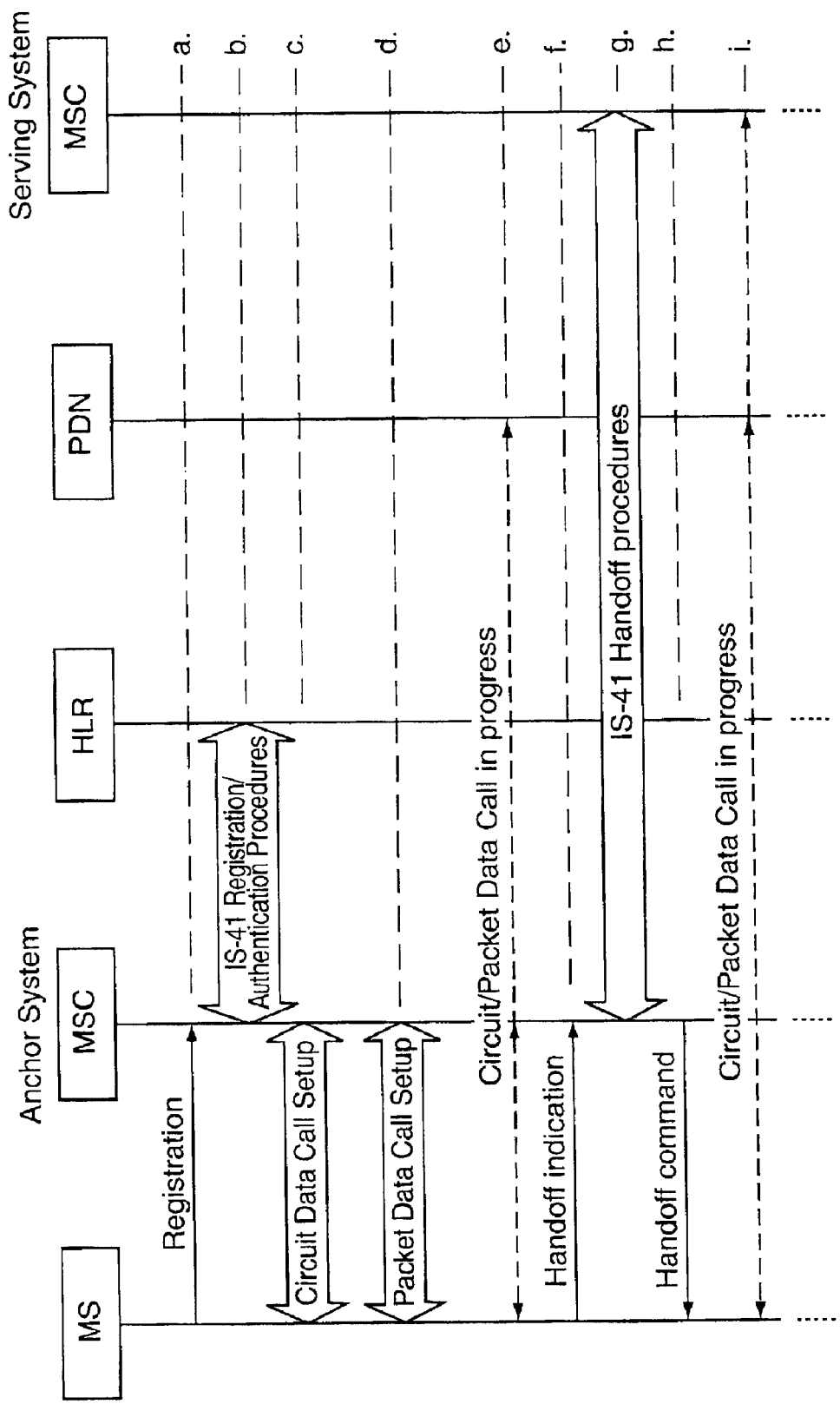
FIGS. 8A and 8B are call flow diagrams illustrating a signaling procedure according to the present invention for an inter-MSC handoff involving a mobile station engaged in concurrent voice and data calls, where the voice call terminates first.
Figure 8B:
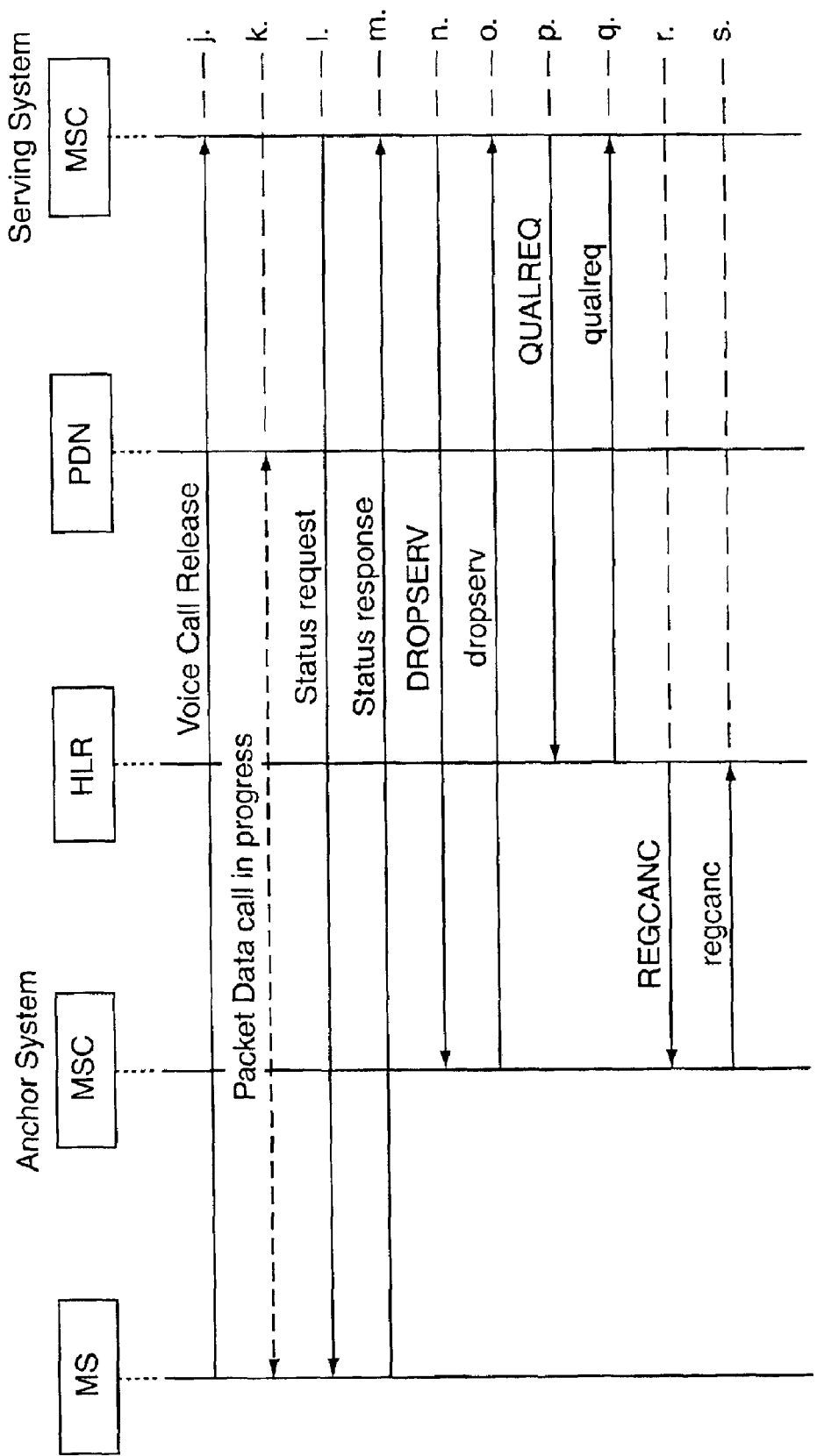

Several additional call flows, presented here as FIGS. 6–8, illustrate practical operations of the above program logic for the various anchor-to-serving MSC call handoff scenarios. FIG. 7 is a call flow diagram illustrating an inter-MSC handoff where the MS 22 is engaged only in an active data call, and includes the following actions:

(a)–(d) show registration and establishment of a packet data call setup in the anchor system as previously described.

(e) While the MS 22 is engaged in an active data call (d), the MS 22 indicates the need for a handoff to a new BS 18 operating under the control of the serving MSC (see also step (a)–(e) in FIG. 4).

(f) The anchor MSC initiates IS-41 handoff procedures to handoff the MS 22 to the serving MSC by sending a handoff request, e.g., a FACDIR2 message. This message, as noted earlier, contains connection- and service-related information, such as the CDMAHandoffInvokeIOSData and CDMAConnectionReferenceList Information elements. The serving MSC looks at the parameters of the CDMAConnectionReferenceList to determine if the handoff request is for a packet data call, circuit switched call, or for a concurrent service. It does this by examining the presence of specific service option numbers corresponding to the different service types. Multiple service options in the CDMAConnectionReferenceList indicate concurrent service handoff. If the CDMAConnectionReferenceList contains either service option 33 (IS-2000 packet data) or another valid IS-707 packet data service option, the handoff is for an active packet data call; otherwise, the handoff is for a circuit switched call (voice call). In this call flow, the serving MSC determines that the handoff request indicates handoff of an active packet data call only. The serving MSC may extract relevant MS-related information such as ISMI, ESN, IS-2000 Mobile Capabilities, Mobile Protocol Revision, BandClass Supported, etc., from the FACDIR2 message and store such information, or provide the information to the serving VLR for storage therein. The serving MSC can determine this information from the parameters of the CDMAHandoffInvokeIOSData information element received in the FACDIR2 message. The serving MSC also sets up the necessary resources at the serving system BS 18 and indicates this action to the anchor MSC.

(g) The anchor MSC indicates to the MS 22 that is should proceed with the handoff.

(h) The packet data call remains active after the handoff.

(i) The serving MSC can additionally request more information from the MS 22, such as the slot cycle index, if the MS 22 is operating in slotted mode, and the user zone identity, which may be stored in the serving VLR as part of the subscriber profile for the MS 22. The serving MSC sends a Status Request message to solicit this information from the MS 22.

(j) The MS 22 returns the requested information to the serving MSC in the Status Response message.

(k) The serving MSC then sends a DROPSERV message to the anchor MSC causing it to clear all resources at the anchor MSC associated with the MS 22. As a result of the DROPSERV message, the anchor MSC considers the MS 22 to be idle.

(l) The anchor MSC sends a dropserv response message to the serving MSC informing it that resources for the MS 22 have been released at the anchor MSC.

(m) The serving MSC, based on information received from the MS 22 and from the handoff request, sends a QUALREQ message to the HLR 26 to initiate registration procedures with the HLR 26, thereby allowing the serving MSC to assume the role of anchor MSC. Other messages may be sent to accomplish the same thing, such as a REGNOT (RegistrationNotification Invoke) message.

(n) The HLR 26 responds (qualreq message) by sending back the subscriber profile, and updates its location information to reflect that the MS 22 is now in the serving system (i.e., the serving system becomes the anchor system).

(o) Finally, the HLR 26 cancels registration of the former anchor MSC by sending it a REGCANC (RegistrationCancellation Invoke) message.

(p) The former anchor MSC deletes the subscriber profile information from the associated anchor VLR's database in response, and indicates this to the HLR 26 by sending it a regcanc response message.

FIG. 8 illustrates the scenario where the serving MSC receives the MS 22 in handoff while the MS 22 is actively engaged in concurrent voice and data calls. FIG. 8 includes the following actions:

(a)–(e) show registration and establishment of a concurrent call setup in the anchor system as previously described.

(f) While the MS 22 is engaged in concurrent voice and data calls, it indicates the need for a handoff to a new BS 18 operating under the control of the serving MSC.

(g) The anchor MSC proceeds with IS-2001-A handoff procedures to handoff the MS 22 to the serving MSC by sending a handoff request to the serving MSC. An inter-MSC trunk will also be set up to act as a bearer for the voice traffic from the anchor MSC to the serving MSC. The serving MSC determines that the handoff request involves concurrent voice and data services based on the presence of multiple service options in the CDMAConnectionReferenceList. The serving MSC proceeds IS-2001-A handoff procedures to setup the necessary resources at the serving BS 18. Once the necessary resources are set up at the serving system, the serving MSC indicates this to the anchor MSC.

(h) The anchor MSC indicates to the MS 22 that is should proceed with the handoff.

(i) Both the circuit-switched and packet data calls remain active after the handoff.

(j) The MS 22 releases the voice call and sends an indication of this to the serving MSC.

(k) The data call remains active.

(l) Since the serving MSC has no subscriber profile information associated with the MS 22, it requests all necessary information such as IMSI, ESN, IS-2000 Mobile capabilities, Slot Cycle Index, User Zone ID, etc., from the MS 22 by sending the Status Request message. The serving MSC also may cull some of this information from the handoff message (FACDIR2 message).

(m) The MS 22 returns the requested information in the Status Response message.

(n) The serving MSC then sends a DROPSERV to the anchor MSC to indicate that both voice and data services have been released, even though the data service is in fact still active.

(o) This causes the anchor MSC to release anchor MSC resources and to release the inter-trunk connection resources. At this point, the anchor MSC considers the MS 22 to be idle, and returns a dropserv response message.

(p) To assume the role of anchor MSC, the serving MSC sends a QUALREQ message to the HLR 26, thereby initiating registration procedures with the HLR 26.

(q) The HLR send back the subscriber profile information for the MS 22 in the qualreq response message, and updates its location information to reflect that the MS 22 is now located in the serving system.

(r) Finally, the HLR 26 causes the former anchor MSC to delete subscriber profile information from the database of the former anchor VLR by sending it a REGCANC message.

(s) The former anchor MSC causes its associated VLR to cancel the profile information, and then it returns the regcanc response message to the HLR 26.

Figure 9:
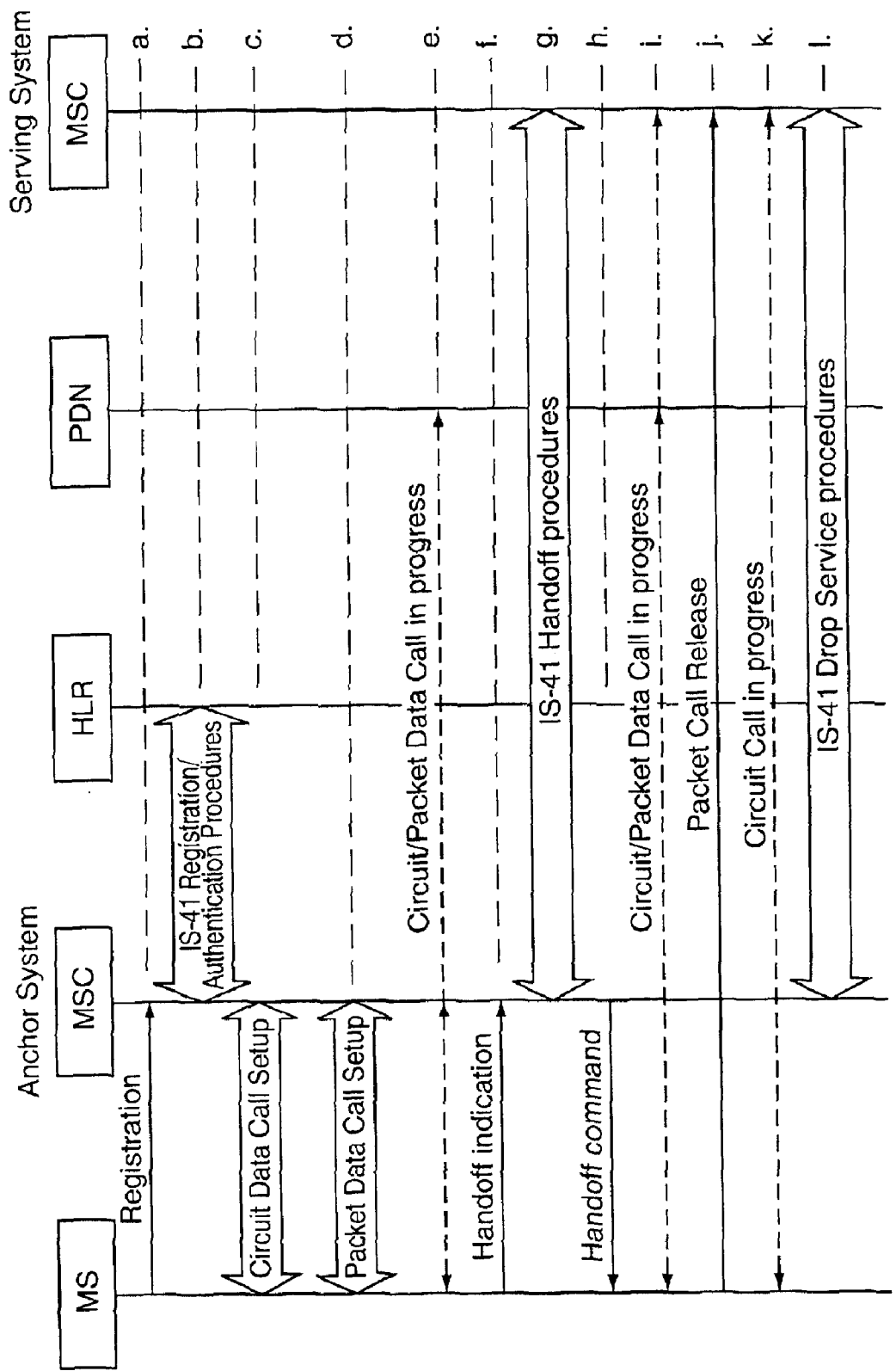
FIG. 9 is a call flow diagram illustrating a signaling procedure according to the present invention for an inter-MSC handoff involving a mobile station engaged in concurrent voice and data calls, where the data call terminates first.

FIG. 9 is similar to FIG. 8, but differs in that the data call is released before the voice call. Thus actions (a)–(i) are identical to the above description. The changed operations illustrated in FIG. 9 include the following actions:

(j) The MS 22 releases the data call.

(k) The voice call remains active.

(l) At some later time, the MS 22 releases the voice call. The serving MSC and the anchor MSC cooperate to release resources associated with the packet data service instance using standard IS-41 release procedures.

Thus, this last scenario illustrates that when the data call is released first after a concurrent-service inter-MSC handoff, the subsequent call release procedures follow conventional steps. However, when the voice call ends before the data call in a concurrent service handoff (FIG. 8), or when the MS 22 is engaged only in an active data call (FIG. 7), the serving MSC practices exemplary embodiments of the present invention to become the anchor MSC, thus routing inefficiencies in a subsequent voice call are avoided.

The actions taken by the serving MSC conform to existing signaling standards. That is, the serving MSC uses existing IS-41 /PN4720 signaling messages to (1) cause the anchor MSC to believe that the data call has ended or gone dormant and (2) to thereby release anchor MSC resources. Further, the serving MSC communicates with the HLR 26, so that the HLR 26 can update its location information for the MS 22 to indicate the serving MSC as the new anchor MSC. This latter action causes a later originating MSC to route subsequent voice call traffic directly to the serving system (new anchor) rather than through the previous anchor system.

Of course, the present invention is subject to many variations in terms of implementation. For example, it may be preferable for serving MSCs to solicit all needed connection-related information from MSs 22, or to obtain at least a portion of it from information in the handoff request message received as part of handoff procedures. Further, the present invention has been presented in the context of IS-41/PN4720 signaling between MSCs in a TIA/EIA/IS-2000 wireless communication network. However, the present invention is not limited to these specific message types, and its essential ideas may be readily adapted to other network types having similar handoff procedures.

The present invention, in an exemplary embodiment, uses defined signaling messages to cause an anchor MSC to believe a data call has been released or gone dormant after being handed off to a serving MSC, even though the call is still active. Standard signaling messages are then used to cause the HLR location information for the MS to be updated, such that the serving MSC takes on the role of anchor MSC, thereby preventing the former anchor MSC from being unnecessarily included in the inter-MSC routing path for a subsequent voice call from an originating MSC. Given this broad scope, the present invention is not limited by the foregoing detailed description. Rather, the present invention is limited only by the scope of the following claims, and the reasonable equivalents thereof.

What is claimed is:

1. A method of improving voice call routing efficiency in an IS-2000 wireless communication network where a mobile station engaged in an active packet data call is handed off from a first mobile switching center to a second mobile switching center, the method comprising:

sending a release message from the second mobile switching center to the first mobile switching center following the handoff to cause the first mobile switching center to release communication resources allocated to the mobile station, wherein said release message is sent while the packet data call is still active; and sending a registration message from the second mobile switching center to a home location register that maintains location information for the mobile station to cause the home location register to identify the second mobile switching center as an anchor mobile switching center for the mobile station.

2. The method of claim 1, further comprising:
determining whether the mobile station is engaged in a concurrent voice call; and
wherein the release message is sent responsive to the handoff if the mobile station is not engaged in a concurrent voice call.

3. The method of claim 1, wherein the mobile station is engaged in a concurrent voice call at the time of the handoff, and wherein the release message is sent following termination of the concurrent voice call if the packet data call remains active.

4. The method of claim 1, wherein sending a release message comprises sending an IS-41 DROPSERV message from the second mobile switching center to the first mobile switching center.

5. The method of claim 1, wherein sending a registration message from the second mobile switching center to the home location register comprises sending an IS-41 QUALREQ message from the second mobile switching center to the home location register.

6. The method of claim 5, further comprising sending an IS-41 REGCANC message from the home location register to the first mobile switching center, such that the first mobile switching center cancels subscriber profile information stored for the mobile station in a first visitor location register associated with the first mobile switching center.

7. The method of claim 5, further comprising:
receiving subscriber profile information for the mobile station from the home location register at the second mobile switching center responsive to sending the registration message; and
storing the subscriber profile information in a second visitor location register associated with the second mobile switching center.

8. The method of claim 1, further comprising receiving mobile-specific information from the first mobile switching center, wherein a portion of the mobile-specific information is included in the registration message.

9. The method of claim 1, further comprising obtaining mobile-specific information from the mobile station, said mobile-specific information being included in the registration message.

10. The method of claim 1, further comprising sending a Status Request message to the mobile station to obtain selected mobile-specific information necessary for reestablishing communication with the mobile station after termination of the active packet data call.

11. A mobile switching center for use in a wireless communication network, the mobile switching center comprising:
a communication interface to connect the mobile switching center with a second mobile switching center and with a signaling network;
a switching circuit for routing voice call data to and from a mobile station in the coverage area of the mobile switching center; and
a system controller operatively connected to the communication interface and to the switching circuit for controlling the operation of the mobile switching center, said system controller operative to:

send a release message via the signaling network to the second mobile switching center following a handoff of a mobile station from the second mobile switching center to the mobile switching center, said mobile station being engaged in a packet data call and said release message being sent while the packet data call is still active to cause the second mobile switching center to release communication resources allocated to the mobile station; and
send a registration message to a home location register associated with the mobile station such that the home location register updates location information stored at the home location register, said location information identifying the mobile switching center as a current anchor mobile switching center for the mobile station.

12. The mobile switching center of claim 11, wherein the mobile switching center sends the release message to the second mobile switching center responsive to the handoff if the mobile station is not engaged in a concurrent voice call at the time of the handoff.

13. The mobile switching center of claim 11, wherein the mobile switching center sends the release message to the second mobile switching center responsive to the termination of a concurrent voice call if the mobile station is engaged in a concurrent voice call at the time of the handoff.

14. The mobile switching center of claim 13, wherein the mobile switching center determines whether the handoff involves concurrent voice and data services by examining service option information included in a handoff message received from the second mobile switching center.

15. The mobile switching center of claim 11, wherein the mobile switching center receives mobile-specific information from the second mobile switching center during handoff of the mobile station, wherein a portion of the mobile-specific information is included in the registration message.

16. The mobile switching center of claim 11, wherein the mobile switching center obtains mobile-specific information from the mobile station, said mobile-specific information being included in the registration message.

17. The mobile switching center of claim 16, wherein the mobile switching center obtains mobile-specific information from the mobile station by sending a Status Request message to the mobile station.

18. A communication network providing both packet data and voice services, comprising:
a first mobile switching center having a first coverage area and connected to a public switched telephone network for routing calls between a mobile station and the public switched telephone network while the mobile station is in the first coverage area;
a second mobile switching center having a second coverage area and connected to the public switched telephone network for routing calls between the mobile station and the public switched telephone network while the mobile station is in the second coverage area;
wherein the second mobile switching center is operative to send a release message to the first mobile switching center and a registration message to a home location register to identify the second mobile switching center as an anchor mobile switching center for the mobile station, wherein the release message is sent following a handoff of a mobile station from the first mobile switching center to the second mobile switching center, said mobile station being engaged in a packet data call, and wherein the release message is sent while the packet data call is still active; and wherein the release message is sent to cause the first mobile switching center to release communication resources allocated to the mobile station engaged in the packet data call.

19. The communication system of claim 18, wherein the second mobile switching center sends the release message to the first mobile switching center responsive to the handoff if the mobile station is not engaged in a concurrent voice call at the time of the handoff.

20. The communication system of claim 18, wherein the second mobile switching center sends the release message to the first mobile switching center responsive to the termination of a concurrent voice call if the mobile station is engaged in a concurrent voice call at the time of the handoff.

21. The communication system of claim 18, wherein the second mobile switching center receives mobile-specific information from the first mobile switching center during hand off of the mobile station, wherein a portion of the mobile-specific information is included in the registration message.

22. The mobile switching center of claim 18, wherein the second mobile switching center obtains mobile-specific information from the mobile station, said mobile-specific information being included in the registration message.

23. The mobile switching center of claim 22, wherein the second mobile switching center obtains mobile-specific information from the mobile station by sending a Status Request message to the mobile station.

* * * * *

UNITED STATES PATENT AND TRADEMARK OFFICE
CERTIFICATE OF CORRECTION

PATENT NO. : 6,917,810 B2  Page 1 of 1
APPLICATION NO. : 10/007586
DATED : July 12, 2005
INVENTOR(S) : Julka et al.

It is certified that error appears in the above-identified patent and that said Letters Patent is hereby corrected as shown below:

Column 15, line 5, should be changed from "communication system of claim 18" to -- communication network of claim 18--.

Column 15, line 10, should be changed from "communication system of claim 18" to -- communication network of claim 18--.

Column 15, line 15, should be changed from "communication system of claim 18" to -- communication network of claim 18--.

Column 16, line 5, should be changed from "mobile switching center of claim 18" to -- communication network of claim 18--.

Column 16, line 10, should be changed from "mobile switching center of claim 22" to -- communication network of claim 22--.

Signed and Sealed this

Twelfth Day of September, 2006

JON W. DUDAS
*Director of the United States Patent and Trademark Office*